UNITED STATES PATENT OFFICE.

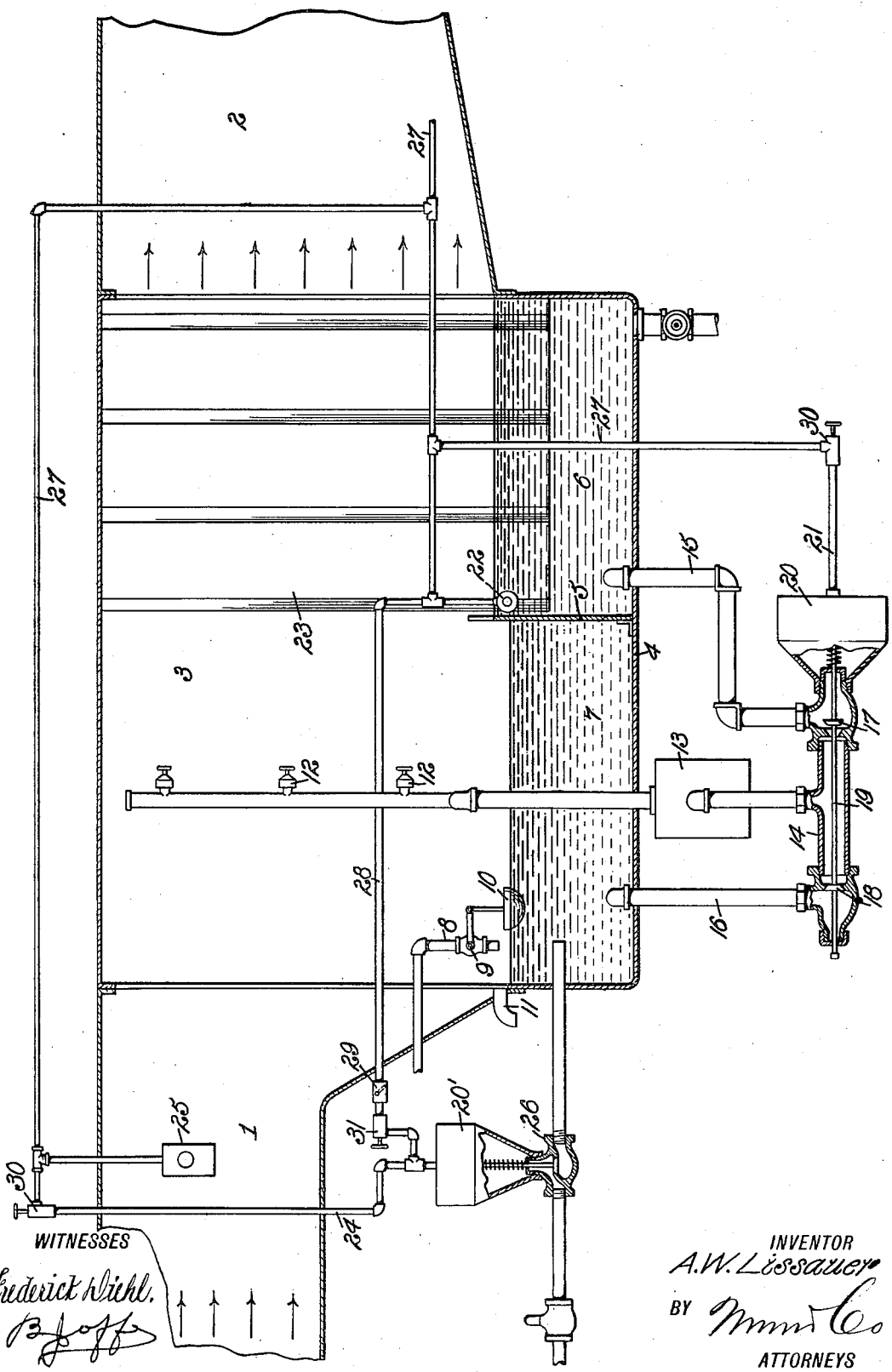

ADOLPH W. LISSAUER, OF NEW YORK, N. Y.

METHOD FOR PURIFYING AND HUMIDIFYING AIR.

1,245,247.     Specification of Letters Patent.     Patented Nov. 6, 1917.

Application filed August 22, 1916. Serial No. 116,266.

*To all whom it may concern:*

Be it known that I, ADOLPH W. LISSAUER, a citizen of the United States, and a resident of the city of New York, borough of Manhattan, in the county and State of New York, have invented a new and Improved Method for Purifying and Humidifying Air, of which the following is a full, clear, and exact description.

An object of my invention is to supply air kept automatically at a constant moisture content irrespective of variation of dry-bulb temperature.

Another object of the invention is to provide a simple, efficient and sensitive method whereby air may be kept at a constant saturation temperature, or absolute humidity, by the action of devices affected by the initial and final moisture and total heat of the air.

In the accompanying drawing, forming part of the application, the figure represents a diagrammatic, sectional view through the apparatus embodying my invention.

It is a well-established fact that the wet-bulb temperature of air is a measure of the total heat of the air (the sum of the sensible and latent heats) and is independent of the proportions in which the said sensible and latent heats exist. Evidently, therefore, an apparatus consisting of a thermostat, influenced solely by the variable, entering wet-bulb temperature can control the temperature of a source of heat and moisture so that the leaving air will have a predetermined absolute humidity independent of temperature.

It has also been established that when air is treated with heat and moisture in quantities sufficient for the purpose, the air is entirely saturated when delivered, and the measure of the total heat is then either the dry or wet-bulb temperature of the said air, the wet and dry bulb temperatures being coincident at the point of saturation, that is, the dew point, or absolute humidity. The temperature of the excess moisture removed at the time of the separation is the same as the temperature of the air. There is a particular advantage in immersing a thermometer or thermostat in this moisture instead of in the air, since in the former case the instrument is surrounded by a fluid of considerably higher specific heat and is, therefore, more sensitive to fluctuation in temperature of the fluid.

In this invention the predetermined absolute humidity is obtained by the variation in temperature of the source of heat and moisture, and it is accomplished by the mixing of water, at a temperature invariably higher than required, with water at a temperature at or lower than required, in proportions automatically controlled. The fluids being of the same specific heats, the resulting mixture will be more responsive to control than in methods previously used, where the temperatures are controlled by means of fluids having differing specific heats, that is, steam and water.

Referring to the drawings, 1 is an air conduit spaced from a similar conduit 2 by a chamber 3 which extends below the conduits to form a sump 4. The chamber has a partition 5 raised from the bottom thereof transversely of the conduits whereby the sump is divided into two compartments 6 and 7. A water inlet 8 is provided for the compartment 7 of the sump and the valve 9 of the said inlet is controlled by a float 10. An overflow 11 is formed from said compartment 7 whereby the level of water in said compartment 7 is maintained constant. The partition 5 rises above the overflow 11, consequently liquid may flow from the compartment 6 into the compartment 7, but not vice versa.

A plurality of sprinklers or nozzles 12 are provided in the chamber 3 above the compartment 7 in the path of the air current moving in the direction indicated by the arrows. The water is supplied to the nozzles by a pump 13, the inlet of which is connected to a mixing valve 14 which has a conduit 15 leading to the compartment 6 and a conduit 16 leading to the compartment 7. The flow from conduits 15 and 16 to the pump 13 is controlled by valves 17 and 18 respectively, the two valves being mounted on a single stem 19 to move in synchronism. The distance between the two valves is such that there can always be a flow through one of the conduits at least, and there may be a flow through both of the conduits.

The stem 19 extends out of the mixing valve to engage a diaphragm mechanism 20 to one side of which air pressure may be applied from a conduit 21. The air pressure supplied to the diaphragm mechanism 20 is controlled by a thermostat 22 located in the compartment 6, or if desired, in a separator 23 provided in the chamber above the compartment 6 in the path of the air current. The separator eliminates the excess of moisture which, in the shape of water particles, may be carried away by the current of the air when the mist is formed in the current by the nozzles 12.

The water in compartment 7 is heated from any suitable source, as, for example, steam supply. The valve 26 of the supply is controlled from a diaphragm mechanism 20' which is subjected to compressed air through a conduit 24. The pressure of the air flowing to the diaphragm mechanism 20' is controlled by a thermostat 25 located in the air conduit 1. The thermostat is surrounded by some substance which is maintained moist so that the temperature controlling the thermostat is the wet bulb temperature. In place of the thermostat, a hydrometer may be used; in which case, the absolute humidity would control the diaphragm mechanism 20'. Both diaphragm mechanisms 20 and 20' are supplied from the same source of compressed fluid through conduits 27. A conduit 28 connects the conduit 24 to that part of the conduit 27 which is connected to the thermostat 22. A check valve 29 is provided in the conduit 28 which prevents the flow of air toward the conduit 24. This connection permits the thermostat 22 to influence the valve 26, through the thermostat 25.

The thermostats used are of the type which vary fluid pressure on the diaphragm valve by variable leakage of air controlled by the temperature to which the thermostats are exposed. Other types of thermostats can be used, either operated by compressed air or other fluids, or by other means. The air pressure from the conduits 27 to the diaphragm mechanism is controlled by throttling devices 30. A throttling device 31 is also provided on the conduit 28 between the check valve 29 and the conduit 24.

The thermostat 22 controls the position of the valves 17 and 18, and therefore, controls the mixture of water coming from the compartments 6 and 7. The thermostat 25 controls the heat supplied through the valve 26. The said thermostat 25 is so constructed that when it is set for a certain temperature and is surrounded by air cooler than that temperature the tendency is to decrease the fluid pressure leak through it and, therefore, shunt more pressure on the diaphragm mechanism 20', which will operate the valve to increase the supply of heating medium, thereby increasing the temperature of the water in the compartment 7. As the temperature of the air surrounding the thermostat 25 reaches the predetermined temperature, the air leak therein increases, in turn decreasing the pressure on the diaphragm mechanism 20', thereby reducing the supply of heating medium, and consequently, lowering the temperature of the water in compartment 7. The rapidity of the leak and, therefore, the movement of the diaphragm mechanism 20' is controlled by the throttle 30. The valve 26 which controls the supply of heating medium is of the reverse-acting type, so that in case of failure of air pressure the valve will automatically close and shut off the supply of heating medium, thus preventing overheating.

The thermostat 22 is of a similar structure and it is set to decrease air leak when the temperature surrounding it is lower than the set temperature. Consequently more air pressure will be exerted on the diaphragm mechanism 20, in consequence of which displacement the valve 17 approaches its seat and the valve 18 is displaced farther from its seat. Therefore a larger quantity of heated water will enter from the compartment 7 and a lesser quantity of cooler water will enter from compartment 6. If the surrounding temperature of thermostat 22 is higher than the set temperature the air leak increases. There is a decrease of pressure on the diaphragm mechanism 20 and, consequently, the supply of heated water is decreased and that of cool water is increased. It will be noted that the mixing valve 14 is of the balancing type; consequently the slightest variation in pressure on the diaphragm mechanism is quickly responded to by the mixing valve.

The thermostat 25 is so set that the water in compartment 7 is maintained at a slightly higher temperature than necessary to heat the spray water to the required temperature when mixed with a predetermined quantity of water from compartment 6. This predetermined quantity of water from compartment 6 is obtained by synchronizing the displacement of the mixing valve 14 and the valve 26 through the medium of the thermostat 22. The temperatures therein referred to are wet bulb temperatures.

Assuming the thermostat 22 is set to maintain a temperature leaving conduit 2 of $T_e$. Thermostat 25 is set to close the valve 26 at an increase in temperature determined to be a certain number of degrees above $T_e$ or $(T_e+A)$. When the entering temperature falls below this point $(T_e+A)$ the air leak in 25 decreases and tends to open the valve 26, heating the water in compartment 7 to a point above that required to heat to $T_e$. When the water in compartment 7 is mixed with a predetermined quantity of water from compartment 6 the tendency is also to heat the water in compartment 6 or the moisture in the separator above $T_e$. In consequence the thermostat 22 increases the air leak, tending to reduce pressure on the diaphragm mechanism 20 and allowing more of the cooler water coming from compartment 6 to mix with less of the heated water from compartment 7.

Due to the same cause, air pressure will be reduced on the diaphragm mechanism 20' of the valve 26 through the medium of the conduit 28. Therefore the valve 26 will move to the closing point in proportion to the movement of the mixing valve 14, which has increased the quantity of cooler water and decreased the amount of the hotter water. The leak of air through the conduit 28 is controlled by the throttling device 31, so that any desired proportion of the displacement between the valves may be obtained. This displacement of the valve 26 reduces the supply of heat to compartment 7, consequently reduces the temperature of the excess of moisture in the separator 23 and, therefore, the water in compartment 6.

Due to the drop of temperature the leak in the thermostat 22 decreases and the mixing valve returns to the normal position. By controlling the valve 26 by the two thermostats 22 and 25 it is possible to control the temperature of the water in compartment 7 to the fraction of a degree, even if the temperature of the entering air is not constant. When the initial temperature of the air current is $T_e + A$, the system is inoperative with the heating medium. By substituting a cooling medium for the heating medium, the action of the apparatus reverses and the same method becomes applicable.

I claim:

1. The method of humidifying air which consists in creating an air current, supplying moisture to the current, and regulating the temperature of the moisture supplied through the medium of the initial and final total heats of the air.

2. The method of humidifying air which consists in creating an air current, supplying a constant amount of moisture to the current, and regulating the temperature of the moisture supplied through the medium of the initial and final moistures of the air.

3. The method of humidifying air which consists in creating an air current, supplying moisture in excess of the amount necessary for saturation of the air, removing the excess of moisture, and regulating the temperature of the moisture supplied through the medium of the initial total heat of the air and the temperature of the excess moisture removed.

4. The method of humidifying air which consists in creating an air current, supplying a constant amount of moisture to the current in excess of the amount necessary for saturation of the air, eliminating the excess of moisture from the air, and regulating the temperature of the moisture supplied through the medium of the initial total heat of the air and the temperature of the moisture eliminated from the air to maintain a predetermined absolute humidity.

5. The method of humidifying air which consists in creating an air current, supplying a constant amount of moisture to the air current, and regulating the temperature of the moisture supplied by a thermostatic control influenced by the initial and final temperatures and moistures of the air.

6. The method of humidifying air which consists in creating an air current, supplying a constant amount of moisture to the air current in excess of the amount necessary for the saturation of the air, eliminating the excess of moisture from the air current, and regulating the temperature of the moisture supplied by a thermostatic control influenced by the temperature and moisture of the initial air and the temperature of the moisture removed from the current.

7. The method of humidifying air which consists in creating an air current, supplying moisture to the air current, eliminating the excess of moisture from the air current, collecting said moisture, mixing the collected moisture with heated water, regulating the temperature of the water through the initial and final total heats of the air, and regulating the quantity of the heated water and moisture which is to be delivered to the air current through the medium of the humidity of the air delivered.

8. The method of humidifying air, which consists in creating an air current, supplying moisture to the air current in excess of the amount necessary for the saturation of the air, eliminating the excess of moisture from the air current, collecting the eliminated moisture and mixing it with heated water to be supplied as moisture to the air current, regulating the temperature of the water through the medium of the absolute humidity of the air and the temperature of the eliminated moisture, and regulating the quantity of the heated water and moisture through the medium of the temperature of the moisture collected.

9. The method of humidifying air which consists in creating an air current, supplying moisture to the air current in excess of the amount necessary for the saturation of the air, eliminating the excess of moisture from the air current, collecting said moisture, mixing said collected moisture with heated water to be supplied as moisture to the air current, regulating the temperature of the water by a thermostatic control influenced by the wet bulb predeterminate temperature of the air and the temperature of the collected moisture, and controlling the quantity of water and moisture mixed by a thermostatic control influenced by the temperature of the moisture removed from the current.

10. A method of humidifying air, which consists in creating an air current, supplying moisture in excess of the amount necessary for the saturation of the air, removing the excess of moisture, and regulating the temperature of the moisture supplied through the medium of the wet bulb temperatures of the entering and leaving air.

11. A method of humidifying air, which consists in creating an air current, supplying moisture in excess of the amount necessary for saturation of the air, removing the excess of moisture, and regulating the temperature of the moisture supplied through the medium of the wet bulb temperature of the air and the temperature of the excess moisture removed.

12. A method of humidifying air, which consists in creating an air current, supplying moisture to the air current, eliminating the excess of moisture from the current, collecting the said moisture, mixing the collected moisture with heated water, regulating the temperature of the water through the medium of the wet bulb temperature of the entering and the leaving air, and regulating the amount of the heated water and moisture to be delivered to the air current through the medium of the wet bulb temperature of the leaving air.

13. A method of humidifying air, which consists in creating an air current, supplying heat and moisture to the current, and keeping the final total heat of the air constant through the medium of the initial and final moisture contents of the air.

14. A method of humidifying air, which consists in creating an air current, supplying moisture to the current, and regulating the temperature of the moisture supplied through the medium of the initial and final moisture contents of the air.

15. A method of humidifying air, which consists in creating an air current, supplying moisture in excess of the amount necessary, to saturate the air, and heat, removing the excess of moisture, and regulating the temperature of the moisture through the medium of the initial and final absolute humidities of the air.

16. A method of humidifying air, which consists in creating an air current, supplying heat and moisture to the current in excess of the amount necessary for saturation of the air, removing the excess of moisture, and regulating the temperature of the moisture supplied through the wet-bulb temperature of the entering air and the temperature of the excess moisture removed.

17. A method of humidifying air, which consists in creating an air current, supplying a heated moisture to the current in excess of the amount necessary for saturation of the air, eliminating the excess of moisture from the air, keeping the temperature of the eliminated moisture constant, and regulating the temperature of the moisture supplied through the medium of the wet-bulb temperature of the entering air and the temperature of the moisture removed.

ADOLPH W. LISSAUER.